Feb. 4, 1930.  J. T. RAMSDEN  1,746,224
MOLDING MACHINE
Filed Nov. 24, 1928
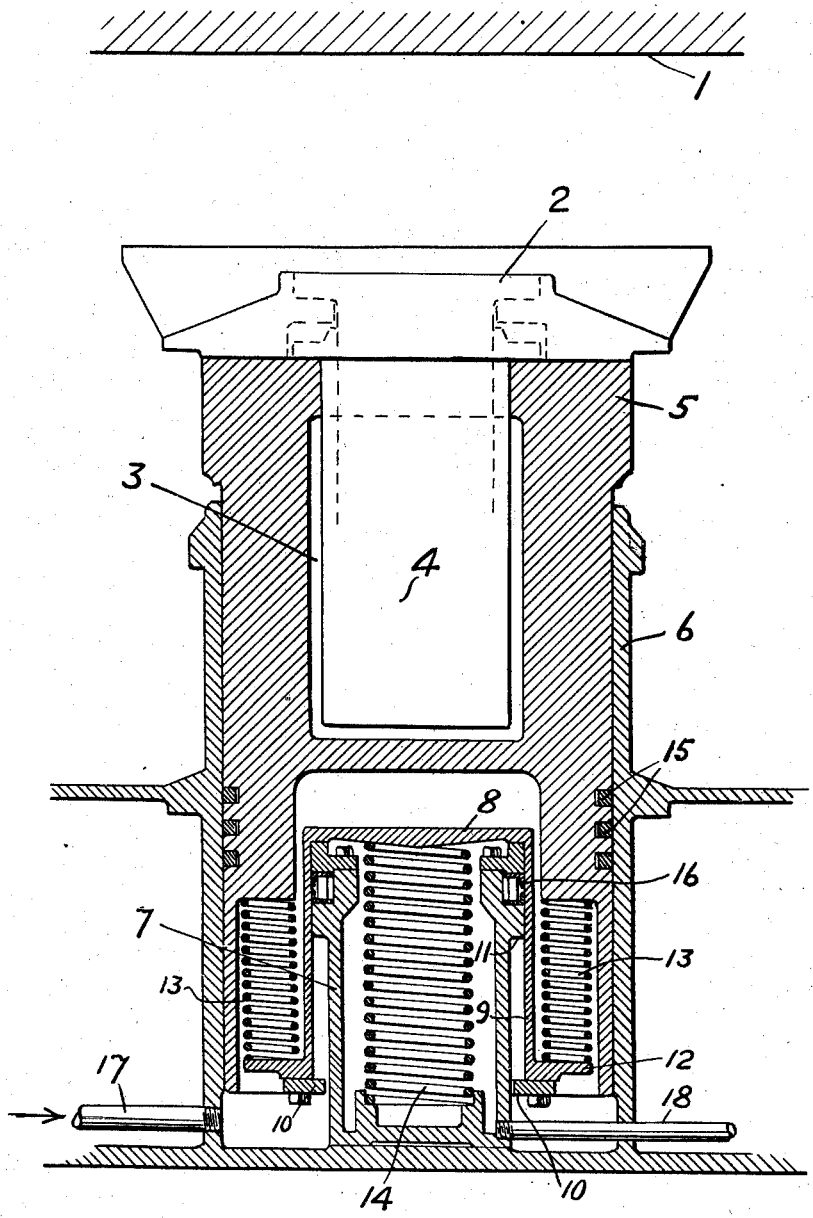
WITNESS:
Rob R Kitchel
INVENTOR
John T. Ramsden
BY
Augustus B. Stoughton,
ATTORNEY.

Patented Feb. 4, 1930

1,746,224

UNITED STATES PATENT OFFICE

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA

MOLDING MACHINE

Application filed November 24, 1928. Serial No. 321,540.

The principal object of the present invention is to provide for using the anvil cylinder of a shockless jarring machine for squeezing as well as for jarring at a high level while permitting the anvil to rise in jarring to meet the falling table, thus retaining or providing a true shockless action.

Generally stated, the invention comprises a molding machine of the shockless type adapted to squeeze and including a head and an anvil and its table and accessories for jarring, an anvil cylinder in which the anvil is arranged with substantially its entire cross-sectional area available for squeezing pressure, a fixed piston and a movable cylinder arranged in the anvil cylinder, a limit stop for the last named cylinder when at high level, and springs interposed between the anvil and the last named cylinder to permit of shockless jarring at high level.

The invention also consists in the improvements to be presently described and finally claimed.

In the following description reference will be made to the single figure of the drawing which is a central sectional view of so much of a molding machine embodying features of the invention as is necessary for an explanation of the latter.

In the accompanying drawing 1 indicates a portion of a ramming head which is arranged over the table 2 and properly secured, for example, to the base of the machine, and this is frequently done in such a way that the head may be swung over the machine or back of it. The ramming head is too well understood to require further explanation or description. The table 2 is mounted on or in a jarring cylinder 3 and there is a jarring piston 4. These are ordinary provisions of a shockless jarring machine and are too well understood to require further explanation or description. 5 is the anvil of a shockless jarring machine, and 6 is the anvil cylinder. There is nothing new about these parts and their operation is such that when the table is falling, it strikes the anvil 5 when the latter is rising or freely suspended upon its spring support.

According to the present invention there is arranged within the anvil cylinder and beneath the anvil a piston 7 fixed to the base of the machine, and a movable cylinder 8 shown as provided with a depending skirt 9 flanged outwardly and inwardly at its lower rim. The inward flange 10 and the shoulder 11 on the piston 7 provide a stop for the cylinder 8 to limit its upward travel. The outward flange 12 constitutes a seat for springs 13 upon the upper ends of which the anvil 5 is seated. In addition to the springs 13 there is shown a spring 14 interposed between the base of the piston 7 and the cylinder head 8 which serves simply to augment the lifting force beneath the cylinder head 8 and may sometimes be omitted but the springs 13 interposed between the anvil 5 and the cylinder head 8 are an important part of the construction. Packing is indicated at 15 and at 16. 17 is an inlet for fluid pressure to the interior of the anvil cylinder 6, and 18 is an inlet for fluid under pressure to the interior of the cylinder 8.

The mode of operation may be described as follows:

Fluid under pressure admitted at 17 acts upon the entire cross-sectional area of the anvil 5 and thus raises it together with table 2 that is mounted upon it toward the head 1 so that a mold containing sand and mounted on the table 2 is squeezed. In some types of molding machines it is desirable to lift the table 2 to a level higher than its lowest level which latter is the position shown in the drawing and to jar the table from such higher level. According to the present invention, that result is accomplished with a true shockless action by admitting fluid under pressure at 18 into the supplemental piston and cylinders 7 and 8, so that the latter rises until the stops 10 and 11 check its lift and in rising the cylinder 8 carries the anvil on the spring supports 13 to a higher level. Then the jarring cylinder and pistons 3 and 4 are operated in a manner that is too well understood to require illustration to raise and lower the table 2. It will be noted that the anvil is quite free on its spring supports so that it cooperates with the rising and falling table 2 to provide a true shockless jarring action.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A shockless jar ramming molding machine adapted to also work as a squeezer and including an anvil and a table and a jarring cylinder and piston, and in combination therewith, a ramming head, an anvil cylinder in which substantially the entire cross sectional area of the anvil is exposed for pressure to squeeze, a lifting piston and cylinder arranged in the anvil cylinder, a stop for limiting the lifting stroke of the lifting piston and cylinder, a spring support interposed between the anvil and the lifting piston and cylinder and upon which the anvil is supported at high level for shockless jar ramming, and fluid connections for the anvil cylinder and for the lifting piston.

2. A shockless jar ramming molding machine including in combination a head, an anvil and its table and jarring means, an anvil cylinder in which the anvil is arranged with substantially its entire cross sectional area available for squeezing pressure, a fixed lifting cylinder and a movable lifting piston arranged in the anvil cylinder, a limit stop interposed between the lifting cylinder and the lifting piston and effective at high level of the lifting cylinder, springs interposed between the anvil and the lifting cylinder to permit of shockless jarring at high level, and fluid connections for the lifting piston and for the anvil cylinder.

3. A shockless jar ramming molding machine including in combination a head, an anvil and its table and jarring means, an anvil cylinder in which the anvil is arranged with substantially its entire cross sectional area available for squeezing pressure, a fixed and lifting piston arranged in the anvil cylinder and provided with a shoulder, a movable lifting cylinder mounted on the lifting piston and provided with a flange arranged to cooperate with the shoulder as a stop and with an outwardly extending flange, springs mounted on the outwardly extending flange and arranged to support the anvil, and fluid connections for the lifting piston and for the anvil cylinder.

4. A shockless jar ramming molding machine including an anvil, a table, a jarring cylinder and a piston, and in combination therewith, a ramming head, an anvil cylinder, a lifting piston and cylinder arranged in the anvil cylinder, a stop for limiting the lifting stroke of the lifting piston and cylinder, a spring support interposed between the anvil and the lifting piston and cylinder and upon which the anvil is supported at high level for shockless jar ramming, and fluid connections for the lifting piston.

JOHN T. RAMSDEN.